(12) United States Patent
Kuk et al.

(10) Patent No.: US 11,333,476 B2
(45) Date of Patent: May 17, 2022

(54) BLASTING SYSTEM AND OPERATING METHOD FOR SAME

(71) Applicant: HANWHA CORPORATION, Seoul (KR)

(72) Inventors: Yong Seok Kuk, Boeun-gun (KR); Ki Woong Park, Boeun-gun (KR)

(73) Assignee: HANWHA CORPORATION, Seoul (KR)

( * ) Notice: Subject to any disclaimer, the term of this patent is extended or adjusted under 35 U.S.C. 154(b) by 94 days.

(21) Appl. No.: 16/632,976

(22) PCT Filed: Dec. 16, 2019

(86) PCT No.: PCT/KR2019/017761
§ 371 (c)(1),
(2) Date: Jan. 22, 2020

(87) PCT Pub. No.: WO2020/138794
PCT Pub. Date: Jul. 2, 2020

(65) Prior Publication Data
US 2021/0223019 A1    Jul. 22, 2021

(30) Foreign Application Priority Data
Dec. 28, 2018  (KR) .......................... 10-2018-0171912

(51) Int. Cl.
*F42D 3/04*     (2006.01)
*F42D 1/045*    (2006.01)
*G01S 19/14*    (2010.01)

(52) U.S. Cl.
CPC .............. *F42D 3/04* (2013.01); *F42D 1/045* (2013.01); *G01S 19/14* (2013.01)

(58) Field of Classification Search
CPC . F42D 3/04; F42D 1/045; F42D 1/055; F42D 1/05
USPC ..................................... 299/13; 102/311, 312
See application file for complete search history.

(56) References Cited

U.S. PATENT DOCUMENTS 6,941,870 B2 *   9/2005  McClure ................. F42D 1/055
                                                        102/311
2005/0103219 A1  5/2005  McClure et al.
2007/0159766 A1  7/2007  Lownds
(Continued)

FOREIGN PATENT DOCUMENTS

WO     2007/085916 A1      8/2007
WO     2015/034882 A1      3/2015
WO     WO2019145598 A1 *   8/2019

*Primary Examiner* — Sunil Singh
(74) *Attorney, Agent, or Firm* — WHDA, LLP

(57) ABSTRACT

The present disclosure relates to a blasting system. The blasting system includes: detonators disposed in blasting holes perforated in a blasting target, and provided to detonate explosives; and a worker terminal configured to be connected to any one of the detonators by a worker. Wherein the worker terminal includes: a storage part configured to store a blasting map; a terminal position generation part configured to generate a terminal position indicating a position of the worker terminal; and a determination part configured to receive the logging signal, and match the terminal position at the time when the worker terminal receives the logging signal with the blasting map to identify a detonator connected to the worker terminal.

6 Claims, 6 Drawing Sheets

(56) References Cited

U.S. PATENT DOCUMENTS

| 2014/0026775 A1* | 1/2014 | Papillon | F42D 1/055 |
| | | | 102/215 |
| 2021/0293518 A1* | 9/2021 | Howe | F23Q 21/00 |

* cited by examiner

| DESIGNED POSITION | IDENTIFIER | SETTING DATA |
|---|---|---|
| P1 | I1 | SD1 |
| P2 | I2 | SD2 |
| ... | ... | ... |
| Pn | In | SDn |

| POINT OF RECEIVING LOGGING SIGNAL | TERMINAL POSITION | DESIGNED POSITION CLOSEST TO TERMINAL POSITION |
|---|---|---|
| T1 | W1 | P1 |
| T2 | W2 | P2 |

BLASTING SYSTEM AND OPERATING METHOD FOR SAME

TECHNICAL FIELD

The present disclosure relates to a blasting system and an operating method for the same and, more particularly, to a blasting system and an operating method for the same, which are configured to automatically connect, on the basis of a position of a worker terminal, an electronic detonator to the worker terminal when the detonator is driven, thus improving worker convenience.

BACKGROUND ART

In general, explosives are used in engineering work, such as in rock blasting and in the demolition of buildings. That is, a plurality of holes, into which explosives are to be inserted, is drilled to correspond to the sections of a blasting target, i.e. the object to be blasted. After an explosive is inserted into each of the drilled holes, the explosives are connected to a blasting system. The explosives are ignited by operating the blasting system, thereby exploding the blasting target.

Such a blasting system includes a detonator serving as an igniter to ignite an explosive and a blasting device providing power necessary for the actuation of the detonator and a command signal to the detonator. Here, the detonator of the blasting system is generally implemented as an electric detonator. The electric detonator is disposed on an explosive side, and a plurality of electric detonators is connected to a single blasting device.

Such electric detonators may have a structure in which a plurality of detonators connected to a blasting device is simultaneously activated to simultaneously detonate explosives, or a structure in which a plurality of detonators connected to a blasting device is set to have different delay times to be sequentially activated to thus sequentially detonate explosives.

Although electric detonators simultaneously detonating a plurality of explosives have been used to date, electric detonators sequentially detonating a plurality of explosives are more commonly used at present. For example, blasting systems using such an electric detonator are disclosed in a plurality of documents, such as Korean Patent No. 10-1016538, Korean Patent No. 10-0665878, Korean Patent No. 10-0665880, Korean Patent No. 10-0733346, and Japanese Patent Application Publication No. 2005-520115.

DISCLOSURE

Technical Problem

Accordingly, the present disclosure has been made keeping in mind the above problems occurring in the prior art, and an objective of the present disclosure is to provide a blasting system and an operating method for the same, which are capable of automatically connecting an electronic detonator to a worker terminal on the basis of a position of the worker terminal, when the detonator is driven.

Another objective of the present invention is to provide a blasting system and an operating method for the same, which are capable of improving worker convenience of blasting work.

Technical Solution

In order to accomplish the above objective, the present disclosure provides a blasting system. The blasting system according to an embodiment of the present disclosure includes: detonators disposed in blasting holes perforated in a blasting target, and provided to detonate explosives; and a worker terminal configured to be connected to any one of the detonators by a worker, wherein, when each of the detonators may be connected to the worker terminal, the detonator may transmit a logging signal to the worker terminal, and the worker terminal may include: a storage part configured to store a blasting map; a terminal position generation part configured to generate a terminal position indicating a position of the worker terminal; and a determination part configured to receive the logging signal, and match the terminal position at a time when the logging signal is received with the blasting map to identify a detonator connected to the worker terminal.

The terminal position generation part may be a global positioning system (GPS) device, which is configured to measure a position of the worker terminal on the basis of a satellite signal.

The determination part may confirm a designed position closest to the terminal position on the blasting map, and identify a detonator corresponding to the confirmed designed position as the connected detonator.

The determination part may transmit setting data corresponding to the connected detonator to the connected detonator on the basis of the blasting map.

Further, the worker terminal further may include: a display part configured to display the blasting map and the terminal position.

The display part may be configured to display a worker position image corresponding to the terminal position and a detonator state image indicating whether the setting data is transmitted, on the blasting map.

The blasting map may include designed positions in which the detonators are disposed, identifiers of the detonators, and setting data about the detonators.

In order to accomplish the above objective, the present disclosure provides an operating method for a blasting system, the blasting system including: detonators disposed in blasting holes perforated in a blasting target, and provided to detonate explosives; and a worker terminal including a terminal position generation part provided to generate a terminal position, the operating method including: storing a blasting map including designed positions in which the detonators are disposed, identifiers of the detonators, and setting data about the detonators; connecting one of the detonators to the worker terminal; receiving, by the worker terminal, a logging signal from the one of the detonators connected to the worker terminal; identifying the connected detonator by the worker terminal by matching the terminal position, at a point of time when the logging signal is received, with the blasting map to identify the connected detonator.

Further, the operating method for a blasting system of the present disclosure may include: transmitting setting data corresponding to the connected detonator to the connected detonator on the basis of the blasting map.

The identifying the connected detonator may include: confirming, by the worker terminal and on the basis of the blasting map, a designed position closest to the terminal position at the point when the logging signal is received; and identifying, by the worker terminal, the connected detonator as a detonator corresponding to the confirmed designed position.

Advantageous Effects

As described above, the blasting system and the operating method for the same according to embodiments of the present disclosure can automatically connect the electronic detonator to the worker terminal on the basis of a position of the worker terminal, when the detonator is driven.

Further, the blasting system and the operating method for the same according to embodiments of the present disclosure can improve worker convenience of blasting work.

The advantages obtainable from the present invention are not limited to the aforementioned advantages, and other advantages not explicitly disclosed herein will be clearly understood by those skilled in the art to which the present invention pertains from the description provided hereinafter.

DESCRIPTION OF REFERENCE NUMERALS

Figure 1:
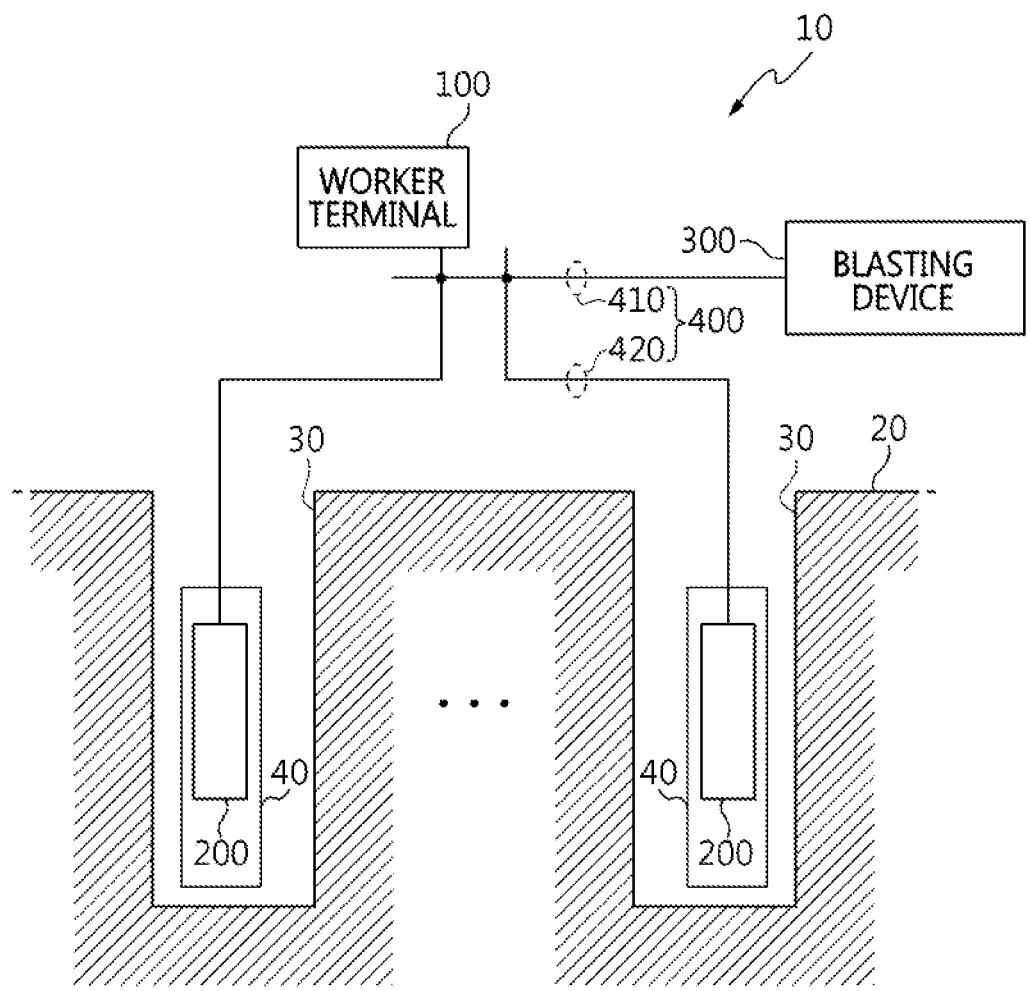
FIG. 1 is a view showing a blasting system according to an embodiment of the present disclosure.

10: blasting system
100: worker terminal
110: storage part
120: terminal position generation part
130: determination part
140: display part
150: input part
200: detonator
300: blasting device
400: wired network

BEST MODE

Hereinafter, embodiments of the present disclosure and matters necessary for those skilled in the art to readily understand the features of the present disclosure will be described in detail with reference to the accompanying drawings. These embodiments are only provided for illustrative purposes, since the present disclosure may be implemented in a variety of different forms without departing from the scope of the present disclosure defined by the claims.

In the drawings, the same components will be designated by the same reference numerals. In addition, the thicknesses, ratios, and sizes of the components may be exaggerated for effective descriptions of technical features. The expression "and/or" includes any one or any combination of the mentioned items.

Terms such as "first" and "second" may be used herein to describe a variety of elements, and the elements should not be limited by the terms. The terms are only used to distinguish one element from other elements. Thus, a first element may be referred to as a second element, and similarly, a second element may be referred to as a first element. Singular forms used herein are intended to mean "one or more" unless the context clearly indicates otherwise.

Terms, such as "below", "beneath", "under", "lower", "above", and "upper", may be used herein for ease of description of the relationship of an element to other elements as illustrated in the drawings. Such terms should be construed as describing relative relationships, and are used with respect to the orientations depicted in the drawings.

Terms, such as "~part" or "module" may mean a separate circuit configuration or a functional module implemented by a computer program.

It will be further understood that the terms "comprise", "include", "have", etc. when used in this specification, specify the presence of stated features, integers, stops, operations, components, parts, and/or combinations thereof, but do not preclude the presence or addition of one or more other features, integers, steps, operations, components, parts, and/or combinations thereof.

That is, the present disclosure is not limited to the embodiments disclosed below, and may be realized in various other forms. It will be understood that when an element is referred to as being "connected" to another element, not only can it be directly connected to the other element, but it can also be electrically connected to the other element via an intervening element. In designating elements of the drawings by reference numerals, the same elements will be designated by the same reference numerals even when they are shown in different drawings.

FIG. 1 is a view showing a blasting system 10 according to an embodiment of the present disclosure.

Referring to FIG. 1, the blasting system 10 may include a worker terminal 100, a detonator 200, a blasting device 300, and a wired network 400.

A worker can perform blasting works with the worker terminal 100. The worker may perforate the blasting target 20 to form blasting holes 30 in order to explode a blasting target 20. The worker can insert explosives 40 to which the detonator 200 is respectively attached into a plurality of blasting holes 30.

The worker can connect the detonator 200 that is inserted in each of the blasting holes 30 to the worker terminal 100. In the specification, connecting the detonator 200 to the worker terminal 100 means logging, and the logging may mean that the detonator 200 is powered on, or the detonator 200 is switched from a sleep mode to a normal mode. In some embodiments, the worker can connect the detonator 200 to the worker terminal 100 by contacting the worker terminal 100 to one end of a detonator wire 420 connected to the detonator 200.

When the detonator 200 is connected to the worker terminal 100, the detonator 200 may communicate with the worker terminal 100 through the wired network 400. That is, the detonator 200 may be connected to the worker terminal 100 in a wired manner. For example, when the detonator 200 and the worker terminal 100 are connected to each other, the detonator 200 may transmit a logging signal indicating that the detonator 200 is connected to the worker terminal 100. The worker terminal 100 may receive the logging signal to confirm that the detonator 200 is connected to the worker terminal 100.

The worker terminal 100 may generate a terminal position indicating a position of the worker terminal 100 by using a global positioning system (GPS) device.

The worker terminal 100 may be connected to any one of detonators 200. The worker terminal 100 may identify the connected detonator 200 on the basis of a blasting map and a terminal position. Herein, the blasting map may mean map data in which information (positions, groups, identifiers, and setting data) about the detonators 200 disposed on the blasting target 20 is displayed. A detailed description of the blasting map will be described in FIG. 3.

The worker terminal 100 may transmit setting data related to an initial setting to the detonator 200. The detonator 200 may receive the preset setting data from the worker terminal 100, and be programed on the basis of the setting data.

The detonator 200 may communicate with the blasting device 300 through the wired network 400. That is, the detonator 200 may be connected to the blasting device 300 in the wired manner.

When the detonator 200 is connected to the blasting device 300, the detonator 200 may transmit detonator information to the blasting device 300. The detonator information may include a detonator identifier, position information, a type of detonator, performance of a detonator, etc. The blasting device 300 may receive and store the detonator information from the detonator 200 through the wired network 400. As shown in FIG. 1, the detonator 200 of the present invention may communicate with the blasting device 300 through the wired network 400, and may also communicate with the worker terminal 100.

On the basis of the detonator information, the blasting device 300 may set up a delay time and an initialization time for the detonator 200. The worker can generate a blasting command by manufacturing the blasting device 300 in order to initiate the blasting. Then, the blasting device 300 may transmit the blasting command including the delay time and the initialization time to the detonator 200 through the wired network 400.

The blasting command may include a delay time corresponding to the detonator 200. The detonator 200 may initiate counting of the delay time. When the counting of the preset delay time is completed, the detonator 200 may detonate an explosive 40 connected thereto. Thus, the worker terminal 100 or the blasting device 300 may explode the blasting target 20 by detonating the explosives 40.

The wired network 400 may include a leading wire 410 connected to the blasting device 300, and detonator wires 420 connected to the detonators 200. That is, the wired network 400 may be implemented in a tree shape that has the leading wire 410 as a trunk and the detonator wire 420 connected to the leading wire 410 as branches.

In FIG. 1, the worker terminal 100 and the blasting device 300 are illustrated as separate configurations, but the present disclosure is not limited thereto. In some embodiments, the worker terminal 100 and the blasting device 300 may be integrally implemented in a single body.

Figure 2:
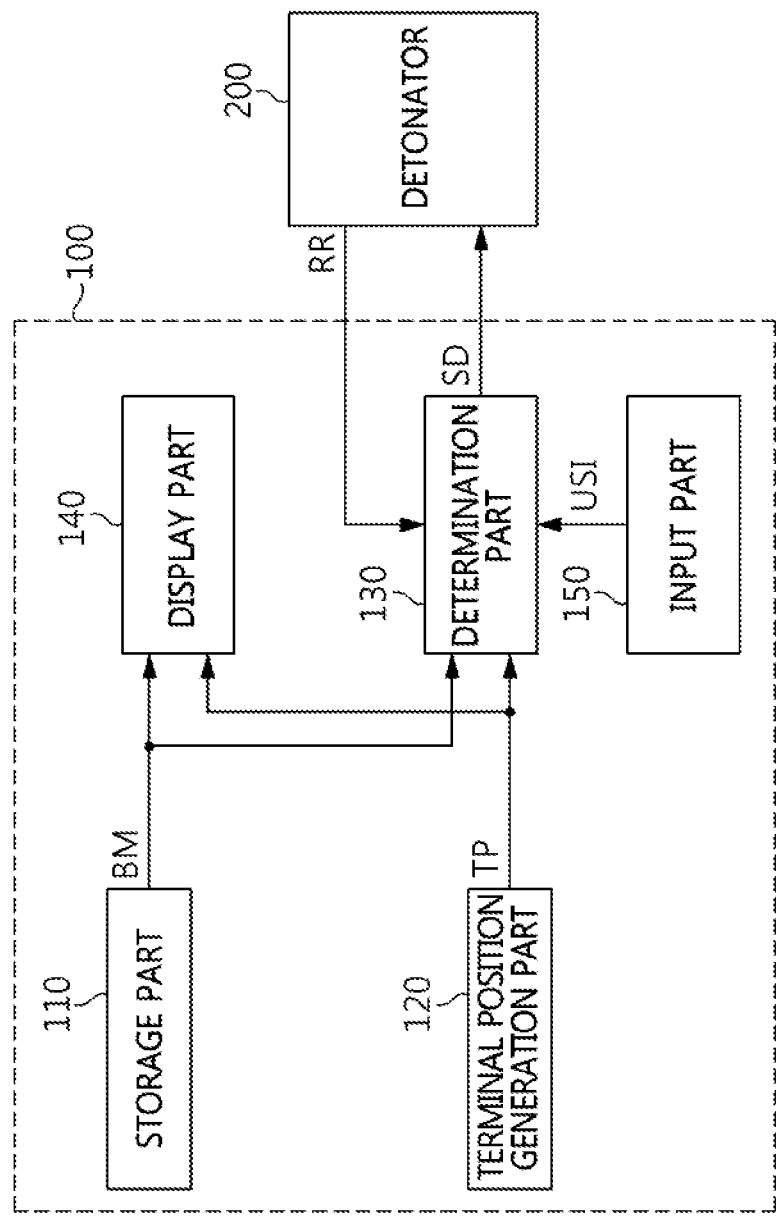
FIG. 2 is a view showing a worker terminal according to an embodiment of the present disclosure.

FIG. 2 is a view showing the worker terminal 100 according to an embodiment of the present disclosure.

Referring to FIG. 2, the worker terminal 100 may include a storage part 110, a terminal position generation part 120, a determination part 130, a display part 140, and an input part 150.

The storage part 110 may store the blasting map BM. In some embodiments, the storage part 110 may be implemented in a read only memory (ROM), a random access memory (RAM), a hard disk drive (HDD), a solid state drive (SSD), etc.

The terminal position generation part 120 may measure a position of the worker terminal 100. In some embodiments, the terminal position generation part 120 may include the GPS device that receives signals from a GPS satellite to accurately measure a current position. The terminal position generation part 120 may generate the terminal position TP for a position of the worker terminal 100. The terminal position TP may be transmitted to the display part 140 and the determination part 130.

The determination part 130 may receive the logging signal RR from the detonator 200 connected to the worker terminal 100. For example, the logging signal RR may be a register request of the detonator 200.

The determination port 130 may match a terminal position TP, at the time when the logging signal RR is received, with the blasting map BM. Accordingly, the determination part 130 may identify the detonator 200 connected to the worker terminal 100. That is, the determination part 130 may confirm a position of the connected detonator 200, and may determine which position the connected detonator 200 corresponds to.

In particular, the detonator 200 connected to the worker terminal 100 may transmit the logging signal RR to the determination part 130. Then, when the determination part 130 receives the logging signal RR, the terminal position TP of the worker terminal 100 may be confirmed in the blasting map BM.

The determination part 130 may confirm a designed position closest to the terminal position TP. The designed position may mean a position where the detonator 200 is disposed when the blasting is designed. The determination part 130 may identify a detonator corresponding to the confirmed designed position as the detonator 200 connected to the worker terminal 100. The determination part 130 may transmit relevant setting data SD to the detonator 200 on the basis of the blasting map BM.

The display part 140 may display the blasting map BM and the terminal position TP on a display area. That is, the display part 140 may display designed positions of the worker terminal 100 and the detonators 200 on the display area.

For example, the display part 140 may display an image about a worker position corresponding to the terminal position TP and an image about a detonator state indicating whether the setting data is transmitted. A detailed description thereof will be described in FIG. 7.

In some embodiments, the display part 140 may be implemented in any one of a liquid crystal display device, an organic light emitting display device, etc, but the present disclosure is not limited thereto. The display part 140 may be implemented in various devices as long as it serves the purpose of displaying an image.

The information about the connected detonator 200 may be input to the input part 150 by the worker. For example, when the determination part 130 is difficult to identify a detonator 200 closest to the worker terminal 100, the input part 150 may directly receive the information about the detonator 200 connected to the worker terminal 100 by the worker.

On the basis of the input, the input part 150 may generate user selected information USI and transmit the USI to the determination part 130. For example, the determination part 130 may identify the detonator 200 connected to the worker terminal 100 on the basis of the USI. In some embodiments, the input part 150 may be implemented with various input devices such as a button, a mouse, a keyboard, a touch panel, and the like.

Figures 3, 4:
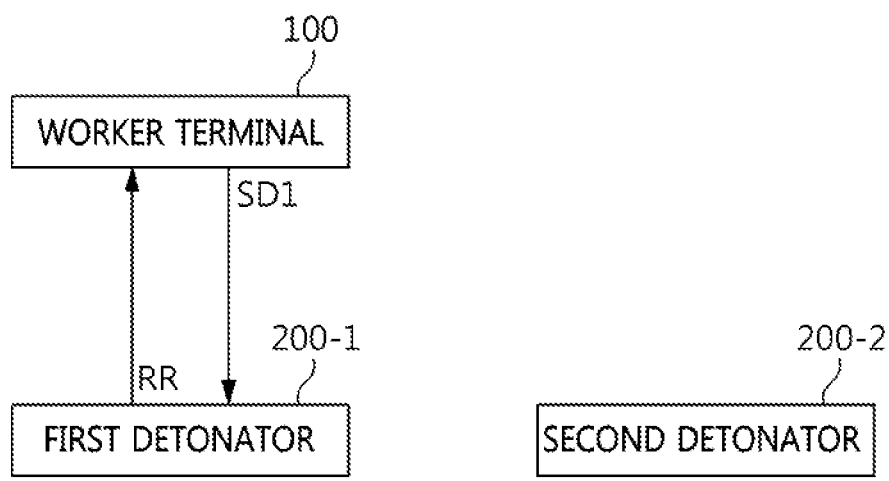
FIG. 3 is a view showing a blasting map according to an embodiment, of the present disclosure.
FIGS. 4 to 6 are views showing operation of the worker terminal according to an embodiment of the present disclosure.

FIG. 3 is the blasting map BM according to an embodiment of the present disclosure.

Referring to FIGS. 1 to 3, for efficient blasting, the blasting map BM may be created when blasting is designed. The created blasting map BM may be stored in the storage part 110.

On the basis of the map data, the blasting map BM may include designed positions (P1, P2, to Pn, n is a natural number of 3 or more) in which the detonators 200 are respectively disposed, identifiers (I1, I2, to In) of the detonators 200, and setting data (SD1, SD2, to SDn) of the detonators 200.

The setting data (SD1, SD2, to SDn) may include delay times, setting information, initialization times for the detonators 200. In some embodiments, the initialization times for the detonators 200 may have the same value.

Figures 5, 6:
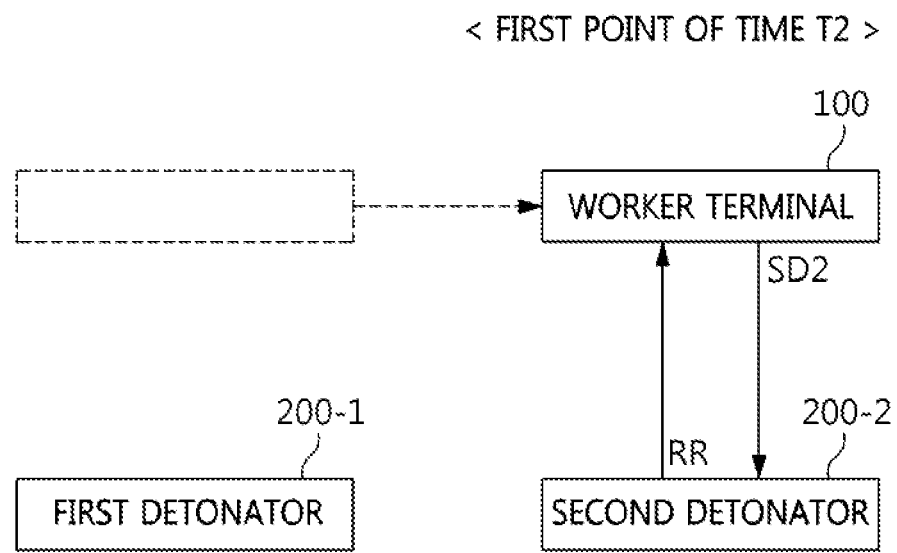

FIGS. 4 to 6 are views showing operation of the worker terminal 100 according to an embodiment of the present disclosure. For convenience of description, a first detonator 200-1 and a second detonator 200-2 are shown in the drawings together, but the present disclosure is not limited thereto. In some embodiments, the detonator may be provided as various numbers.

Referring to FIGS. 4 to 6, the worker can move along a work path with the worker terminal 100, and can connect the first detonator 200-1 and the second detonator 200-2, which are positioned in the work path, to the worker terminal 100, respectively.

As shown in FIG. 4, at a first point of time T1, the worker can connect the first detonator 200-1 to the worker terminal 100.

The first detonator 200-1 connected to the worker terminal 100 may transmit the logging signal RR to the worker terminal 100.

The worker terminal 100 may match a terminal position W1 at the time when the worker terminal 100 receives the logging signal RR with the blasting map, thus identifying a detonator connected to the worker terminal 100 as the first detonator 200-1.

In particular, the determination part 130 (referring to FIG. 2) of the worker terminal 100 may confirm a designed position closest to the worker terminal 100 at the time when the worker terminal 100 receives the logging signal RR (that is, the first point of time T1). The determination part 130 may identify a detonator corresponding to the confirmed designed position P1 as the first detonator 200-1.

Accordingly, on the basis of the blasting map, the worker terminal 100 may transmit a first setting data SD1 corresponding to the first detonator 200-1 to the first detonator 200-1.

As shown in FIG. 5, at a second point of time T2, the worker may connect the second detonator 200-2 to the worker terminal 100.

The second detonator 200-2 connected to the worker terminal 100 may transmit the logging signal RR to the worker terminal 100.

The worker terminal 100 may match a terminal position W2 at the time when the worker terminal 100 receives the logging signal RR with the blasting map, thus identifying a detonator connected to the worker terminal 100 as the second detonator 200-2.

In particular, the determination part 130 of the worker terminal 100 may confirm a designed position closest to the worker terminal 100 at the time when the worker terminal 100 receives the logging signal RR (that is, the second point of time T2) on the blasting map. The determination part 130 may identify a detonator corresponding to the confirmed designed position P2 as the second detonator 200-2.

Accordingly, the worker terminal 100 may transmit second setting data SD2 corresponding to the second detonator 200-2 to the second detonator 200-2 on the basis of the blasting map.

Figure 7:
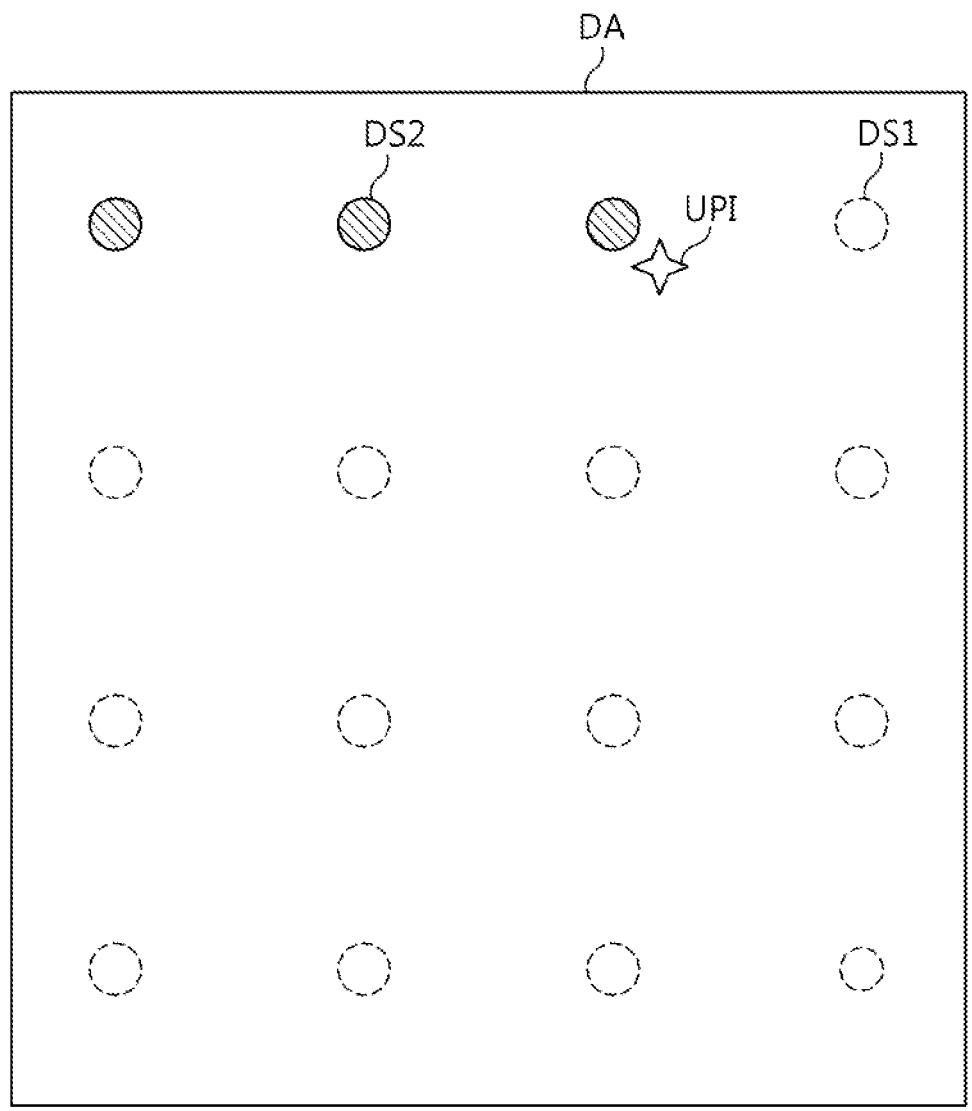
FIG. 7 is a view showing a display area of a display part according to an embodiment of the present disclosure.

FIG. 7 is a view showing the display area DA of the display part 140 according to an embodiment of the present disclosure.

Referring to FIGS. 1, 2, and 7, the display part 140 may display a terminal position of the worker terminal 100 and the blasting map on the display area DA.

For example, the display part 140 may indicate the terminal position TP of the worker terminal 100 with a user position image UPI. For convenience of description, the user position image UPI is illustrated as an arbitrary shape (star shape), but the present disclosure is not limited thereto. In some embodiments, the display part 140 may indicate the terminal position TP of the worker terminal 100 in various ways on the display area DA.

Further, through the display area DA, the display part 140 may display a detonator state image indicating whether the setting data is transmitted. For example, the display part 140 may indicate a first state in which the setting data is not transmitted with a first state image DS1, and indicate a second state in which the setting data is transmitted with a second state image DS2. For convenience of description, the first and second state images DS1 and DS2 are illustrated to have arbitrary shapes (dotted circle and patterned circle), but the present disclosure is not limited thereto. In some embodiments, the display part 140 may display the detonator state image, which indicates whether the setting data is transmitted, in various ways through the display area DA.

Figure 8:
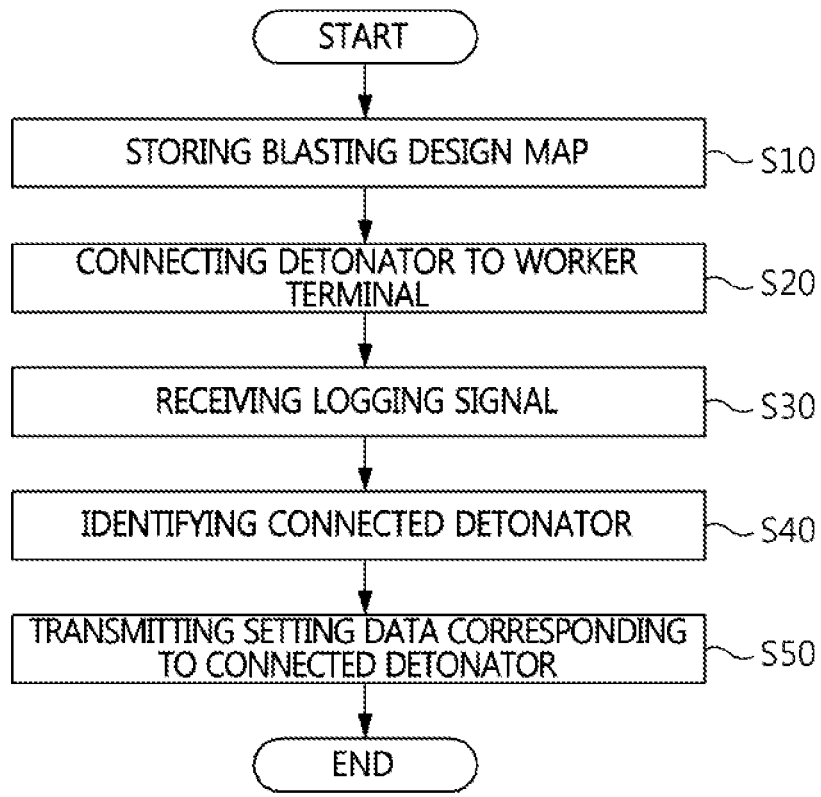
FIG. 8 is a view showing a method of operating the blasting system according to an embodiment of the present disclosure.

FIG. 8 is a view showing a method of operating the blasting system according to an embodiment of the present disclosure.

Preferring to FIGS. 1 to 8, the blasting system 10 may store the blasting map BM (S10). That is, the worker terminal 100 of the blasting system 10 may store the blasting map BM by using the storage part 110.

One of the detonators 200 may be connected to the worker terminal 100. That is, the worker may connect the worker terminal 100 to one end of the detonator wire 420 connected to the detonator 200, thus connecting the worker terminal 100 and the detonator 200 to each other.

The detonator 200 connected to the worker terminal 100 may transmit the logging signal RR to the worker terminal 100, and the worker terminal 100 may receive the logging signal RR (S30). That is, the determination part 130 of the worker terminal 100 may receive the logging signal RR from the detonator 200 through the detonator wire 420.

The worker terminal 100 may identify the detonator 200 connected to the worker terminal 100 (S40). That is, the determination part 130 of the worker terminal 100 may match the terminal position TP at the time when the worker terminal 100 receives the logging signal RR with the blasting map BM. Thus, the determination part 130 may identify the connected detonator 200. The determination part 130 may confirm a position of the connected detonator 200, and confirm which position the connected detonator 200 corresponds to.

The worker terminal 100 may transmit the setting data SD to the confirmed detonator 200 (S50). That is, the determination part 130 of the worker terminal 100 may transmit the relevant setting data SD to the connected detonator 200 on the basis of the blasting map BM.

Figure 9:
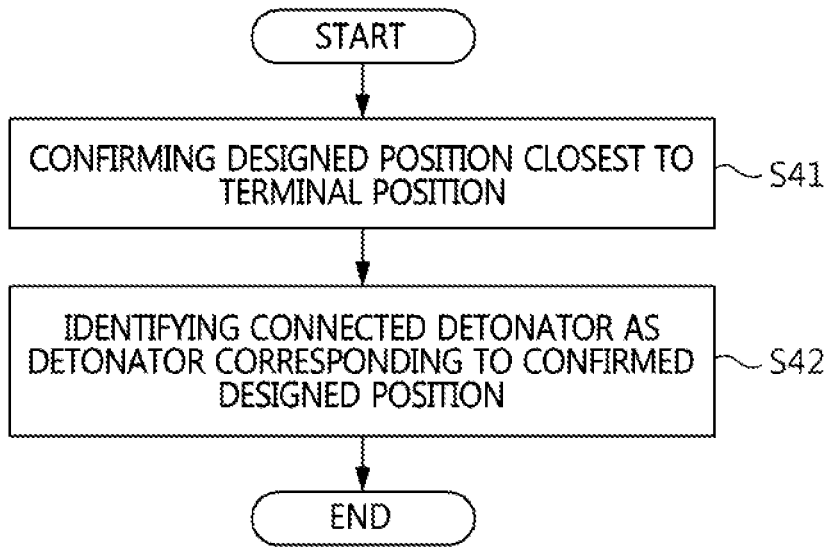
FIG. 9 is a view showing the method of operating the blasting system in detail according to an embodiment of the present disclosure.

FIG. 9 is a view showing the method of operating the blasting system in detail according to an embodiment of the present disclosure.

Referring to FIGS. 1 to 9, the identifying the connected detonator 200 of the step S40 shown in FIG. 8 will be described in detail.

On the basis of the blasting map BM, the worker terminal 100 may confirm a designed position closest to the terminal position TP at the time when worker terminal 100 receives the logging signal RR (S41). That is, the determination part 130 of the worker terminal 100 may find the designed position closest to the terminal position TP on the blasting map BM, the terminal position TP being a position at the time when the worker terminal 100 receives the logging signal RR. Accordingly, the determination part 130 may compensate for an error between a designed position and an actual position of the detonator, and an error generated by estimating a position of the worker terminal 100 as a position of the detonator.

The worker terminal 100 may identify the connected detonator as a detonator corresponding to the confirmed designed position. That is, the determination part 130 may identify the detonator corresponding to the confirmed designed position as the detonator 200 connected to the worker terminal 100.

As described above, the blasting system and the operating method for a blasting system according to embodiments of the present disclosure can automatically connect, on the basis of a position of the worker terminal, the electronic detonator to the worker terminal when the detonator is driven. In this specification, the driving of the detonator means that the detonator is powered-on by the operator.

Further, the blasting system and the operating method for a blasting system according to embodiments of the present disclosure can improve worker convenience when performing blasting work.

Although the exemplary embodiments of the present disclosure have been described for illustrative purposes, those skilled in the art or those having ordinary knowledge in the art will appreciate that various modifications, additions and substitutions are possible without departing from the scope and spirit of the present disclosure as disclosed in the accompanying claims.

Therefore, the technical scope of the present disclosure is not limited to the exemplary embodiments described herein, but should be determined on the basis of the claims.

The invention claimed is:

1. A blasting system comprising:
   detonators disposed in blasting holes perforated in a blasting target, and provided to detonate explosives; and
   a worker terminal configured to be connected to any one of the detonators by a worker,
   wherein, when each of the detonators is connected to the worker terminal, the detonator transmits a logging signal to the worker terminal, and
   the worker terminal comprises:
   a storage part configured to store a blasting map;
   a terminal position generation part configured to generate a terminal position indicating a position of the worker terminal;
   a determination part configured to receive the logging signal, and match the terminal position of the worker terminal at a time when the logging signal is received with the blasting map to identify a detonator connected to the worker terminal; and
   an input part configured to receive information about the detonator connected to the worker terminal by the worker when the determination part fails to identify the detonator closest to the worker terminal,
   wherein the determination part confirms a designed position closest to the terminal position on the blasting map, identifies a detonator corresponding to the confirmed designed position as the connected detonator, and transmits setting data corresponding to the connected detonator to the connected detonator on the basis of the blasting map,
   wherein the logging signal is a register request of the detonator, and the setting data is data related to an initial setting to the detonator, and
   wherein the input part generates user selected information and transmits the user selected information to the determination part, and the determination part identifies the detonator connected to the worker terminal on the basis of the user selected information.

2. The blasting system of claim 1, wherein the terminal position generation part is a global positioning system (GPS) device, which is configured to measure a position of the worker terminal on the basis of a satellite signal.

3. The blasting system of claim 1, wherein the worker terminal further comprises:
   a display part configured to display the blasting map and the terminal position.

4. The blasting system of claim 3, wherein the display part is configured to display a worker position image corresponding to the terminal position and a detonator state image indicating whether the setting data is transmitted, on the blasting map.

5. The blasting system of claim 1, wherein the blasting map includes designed positions in which the detonators are disposed, identifiers of the detonators, and setting data about the detonators.

6. An operating method for a blasting system, the blasting system including: detonators disposed in blasting holes perforated in a blasting target, and provided to detonate explosives; and a worker terminal including a terminal position generation part provided to generate a terminal position, the operating method comprising:
   storing a blasting map including designed positions in which the detonators are disposed, identifiers of the detonators, and setting data about the detonators;
   connecting one of the detonators to the worker terminal;
   receiving, by the worker terminal, a logging signal from the one of the detonators connected to the worker terminal;
   identifying the connected detonator by the worker terminal, by matching the terminal position of the worker terminal, at a point of time when the logging signal is received, with the blasting map to identify the connected detonator; and
   transmitting setting data corresponding to the connected detonator to the connected detonator on the basis of the blasting map,
   wherein the identifying the connected detonator comprises:
   confirming, by the worker terminal and on the basis of the blasting map, a designed position closest to the terminal position at the point when the logging signal is received;
   identifying, by the worker terminal, the connected detonator as a detonator corresponding to the confirmed designed position;
   receiving, by the worker terminal, information about the detonator connected to the worker terminal from the worker when the worker terminal fails to identify the detonator closest to the worker terminal;
   generating, by the worker terminal, user selected information; and identifying, by the worker terminal, the detonator connected to the worker terminal on the basis of the user selected information,
wherein the logging signal is a register request of the detonator, and the setting data is data related to an initial setting to the detonator.

* * * * *